(12) United States Patent
Noble et al.

(10) Patent No.: US 8,869,629 B2
(45) Date of Patent: Oct. 28, 2014

(54) SYSTEM AND METHOD FOR MONITORING AGRICULTURAL PRODUCT DELIVERY

(75) Inventors: Scott David Noble, Saskatoon (CA); David Matthew Pastl, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 198 days.

(21) Appl. No.: 13/415,352

(22) Filed: Mar. 8, 2012

(65) Prior Publication Data
US 2013/0233088 A1 Sep. 12, 2013

(51) Int. Cl.
*G01F 1/30* (2006.01)

(52) U.S. Cl.
USPC ...................................... 73/861.73

(58) Field of Classification Search
USPC ............... 73/861.11, 861.77, 861.73, 861.28, 73/861.12, 53.01, 861.08, 861.71, 861.13, 73/861.15–861.17; 342/688, 686
See application file for complete search history.

(56) References Cited

U.S. PATENT DOCUMENTS

| | | | |
|---|---|---|---|
| 2,536,693 A | | 1/1951 | Ferenc |
| 4,109,824 A | | 8/1978 | Davis |
| 4,166,948 A | | 9/1979 | Steffen |
| 4,239,010 A | | 12/1980 | Amburn |
| 4,674,337 A | * | 6/1987 | Jonas .......................... 73/861.73 |
| 4,736,635 A | * | 4/1988 | Murase ....................... 73/861.15 |
| 4,782,282 A | | 11/1988 | Bachman |
| 4,900,200 A | * | 2/1990 | Harumoto et al. ............... 406/93 |
| 5,257,530 A | * | 11/1993 | Beattie et al. ................. 73/61.75 |
| 5,454,271 A | * | 10/1995 | Yamamoto et al. ......... 73/861.04 |
| 5,560,246 A | * | 10/1996 | Bottinger et al. ........... 73/861.15 |
| 5,571,974 A | * | 11/1996 | Nauful ........................ 73/861.27 |
| 5,837,906 A | * | 11/1998 | Palmer ........................ 73/861.73 |
| 5,929,343 A | * | 7/1999 | Yamamoto et al. ......... 73/861.08 |
| 6,208,255 B1 | | 3/2001 | Conrad |
| 6,237,424 B1 | * | 5/2001 | Salmasi et al. .............. 73/861.17 |
| 6,922,059 B2 | | 7/2005 | Zank |
| 7,340,967 B2 | * | 3/2008 | Zweifel ....................... 73/861.71 |
| 7,574,907 B2 | * | 8/2009 | Maute .......................... 73/152.29 |
| 8,499,647 B2 | * | 8/2013 | Mitsutake .................. 73/861.08 |
| 2012/0046838 A1 | | 2/2012 | Landphair |
| 2012/0227647 A1 | | 9/2012 | Gelinske |

OTHER PUBLICATIONS

Yan, Y., "Velocity Measurement of Pneumatically Conveyed Solids Using Electrodynamic Sensors," Meas. Sci. Technol. 6 (1995) 515-537.
Gajewski, J.B., "Electrostatic, Inductive Ring Probe Bandwidth," Meas. Sci. Technol. 7 (1996; 1999) 1766-1775.
Rahmat, M.F. et al., "Electrostatic Sensor for Real-Time Mass Flow Rate Measurement of Particle Conveying in Pneumatic Pipeline," Jumal Teknologi, 41(D) Dis. 2004; 91-104; Universiti Teknologi Malaysia.
Rahmat, M.F. et al., "An Electrodynamic Sensor for Electrostatic Charge Measurement," International Journal on Smart Sensing and Intelligent Systems. vol. 2, No. 2 (Jun. 2009) 200-212.
Ghazali, M.R. et al., "Electrostatic Sensor in Circular and Rectangular Shape Electrode for Solid Dry Pneumatic Conveyor System," 2011 International Conference on Circuits, System and Simulation, IPCSIT, vol. 7 (2011) IACSIT Press, Singapore.

* cited by examiner

*Primary Examiner* — Jewel V Thompson
(74) *Attorney, Agent, or Firm* — Rebecca L. Henkel

(57) ABSTRACT

An agricultural product delivery system includes a conduit. The conduit of the agricultural product delivery system is configured to enable agricultural product to pass therethrough. The agricultural product delivery system also includes a first electrostatic sensor coupled to the conduit, and configured to detect the agricultural product passing through the conduit.

21 Claims, 7 Drawing Sheets

SYSTEM AND METHOD FOR MONITORING AGRICULTURAL PRODUCT DELIVERY

BACKGROUND

The invention relates generally to agricultural product delivery and, more particularly, to a system and method for monitoring agricultural product delivery.

Generally, seeding implements are towed behind a tractor or other work vehicle via a mounting bracket secured to a rigid frame of a planter or seeder. These seeding implements typically include a ground engaging tool or opener that forms a seeding path for seed deposition into the soil. The opener is used to break the soil to enable seed deposition. After the seed is deposited, the opener is followed by a packer wheel that packs the soil on top of the deposited seed.

Certain seeding implements include a metering system configured to provide a flow of seeds to a seed tube which deposits the seeds into the soil. By operating the metering system at a particular speed, a desired seed spacing may be established as the implement traverses a field. Unfortunately, under certain conditions the number of seeds flowing through the seed tube deviates from an anticipated range (e.g., due to vibration, blockage, seed size, etc.). Furthermore, it may be difficult to determine when the number of seeds flowing through the seed tube varies from the anticipated range, or when the seed tube is blocked, preventing a flow of material. Consequently, certain seed monitoring systems have been developed to monitor seed flow through the seed tube. Such systems may be expensive to produce and operate. Further, such systems may inaccurately monitor small seeds.

BRIEF DESCRIPTION

In one embodiment, an agricultural product delivery system includes a conduit configured to enable agricultural product to pass therethrough. The agricultural product delivery system also includes a first electrostatic sensor coupled to the conduit, and configured to detect the agricultural product passing through the conduit.

In another embodiment, a method for monitoring agricultural product passing through a conduit of an agricultural product delivery system includes receiving a first signal from a first electrostatic sensor. The first signal is indicative of the agricultural product passing through the conduit of the agricultural product delivery system. The method also includes measuring at least one flow property of the agricultural product based on the first signal.

In another embodiment, an agricultural product delivery system includes an electrostatic sensor configured to couple to a conduit to detect agricultural product passing through the conduit. The agricultural product monitoring system also includes sensor monitoring circuitry electrically coupled to the electrostatic sensor. The sensor monitoring circuitry is configured to amplify signals output by the electrostatic sensor. The agricultural product monitoring system includes control circuitry electrically coupled to the sensor monitoring circuitry. The control circuitry is configured to receive the amplified signals from the sensor monitoring circuitry, and to determine a quantity of the agricultural product passing through the conduit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
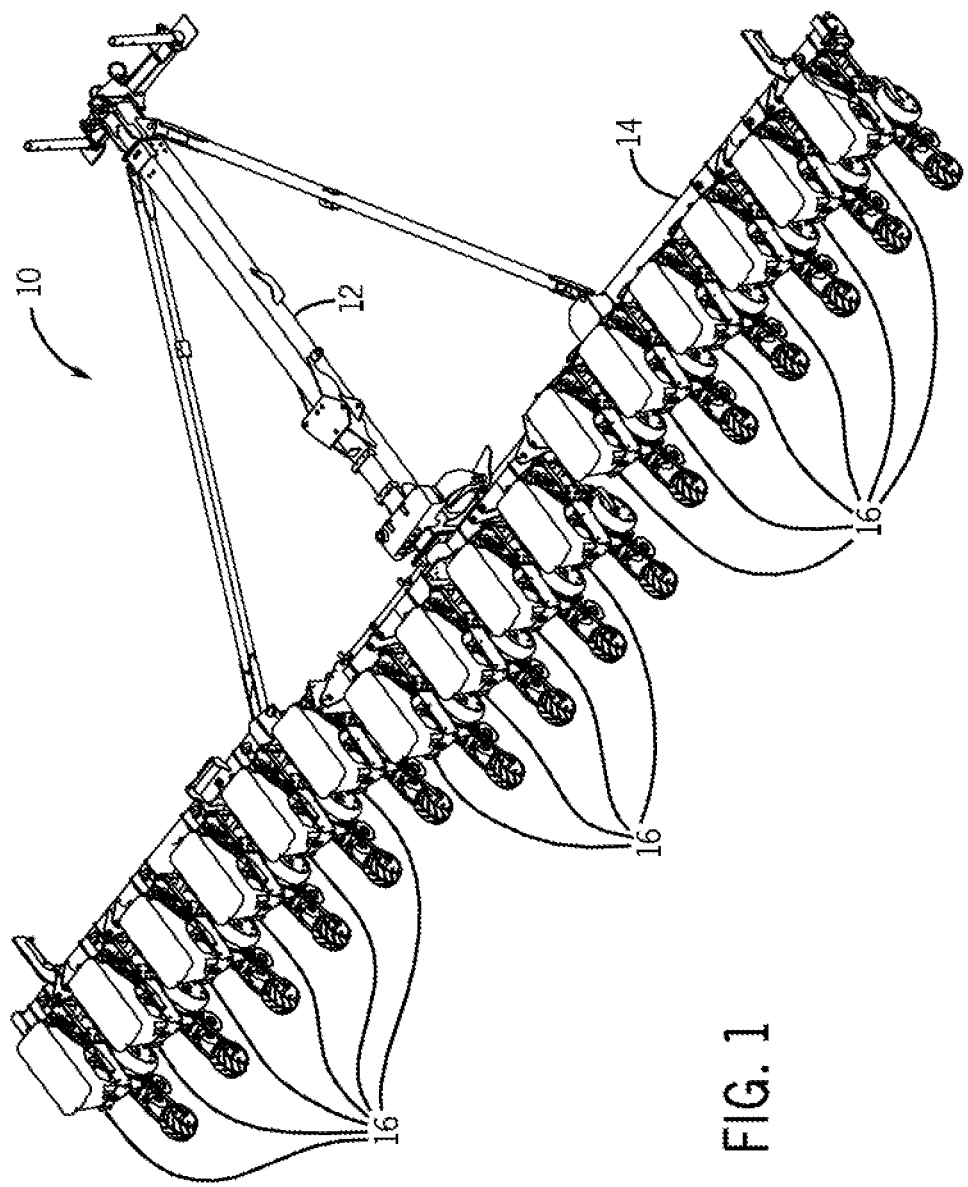
FIG. 1 is a perspective view of an embodiment of an agricultural implement including at least one row unit having an electrostatic sensor configured to detect seeds flowing through a seed tube.

Turning now to the drawings, FIG. 1 is a perspective view of an agricultural implement 10 designed to be towed behind a work vehicle such as a tractor. The implement 10 includes a tow bar assembly 12 which is arranged in the form of an A-frame hitch assembly. The tow bar assembly 12 may include a hitch used to attach to an appropriate tractor hitch via a ball, clevis, or other coupling. The tow bar assembly 12 is coupled to a tool bar 14 which supports multiple seeding implements or row units 16. As discussed in detail below, one or more row units 16 may include an electrostatic sensor configured to detect seeds as they flow through a seed tube. Signals from the electrostatic sensors may be amplified and used to determine a number of seeds flowing through each seed tube, and/or a speed of seeds through the seed tube. Further, the determined number of seeds flowing through the seed tubes may be used to calibrate and/or to adjust the settings of a product delivery system. For example, if the number of seeds flowing through the seed tube is greater than desired, the product flow rate may be decreased (e.g., by decreasing the output of a metering device). Conversely, if the number of seeds flowing through the seed tube is less than desired, the product flow rate may be increased (e.g., by increasing the output of a metering device). As will be appreciated, the product flow rate may be manually adjusted, or automatically controlled using a control system. For example, an operator may manually adjust the product flow rate of the product delivery system via a control panel within the tow vehicle. Alternatively, the control system may automatically adjust the product flow rate of the product delivery system based on the determined number of seeds and/or the determined speed of the seeds through the seed tube. Thus, embodiments incorporating the electrostatic sensor may significantly decrease the cost associated with planting due to seeds being more accurately distributed.

It should be noted that, while an embodiment of a planting implement is illustrated in FIG. 1, any suitable implement (or other material conveying mechanism) may include electrostatic sensors. For example, the electrostatic sensors described herein may be used with an air seeder. In such a configuration, the electrostatic sensors may be coupled to any conduits of the air seeder, such as conduits between a primary distribution header and a secondary distribution header, between the secondary distribution header and a seed distribution device, or any combination thereof. Such a configuration may also include a pneumatic system to direct agricultural product from a metering assembly to the seed distribution device. As will be appreciated, agricultural product may accumulate a static charge as it travels through the pneumatic flow. The static charge induces a charge on the electrostatic sensors as explained in detail below.

Figure 2:
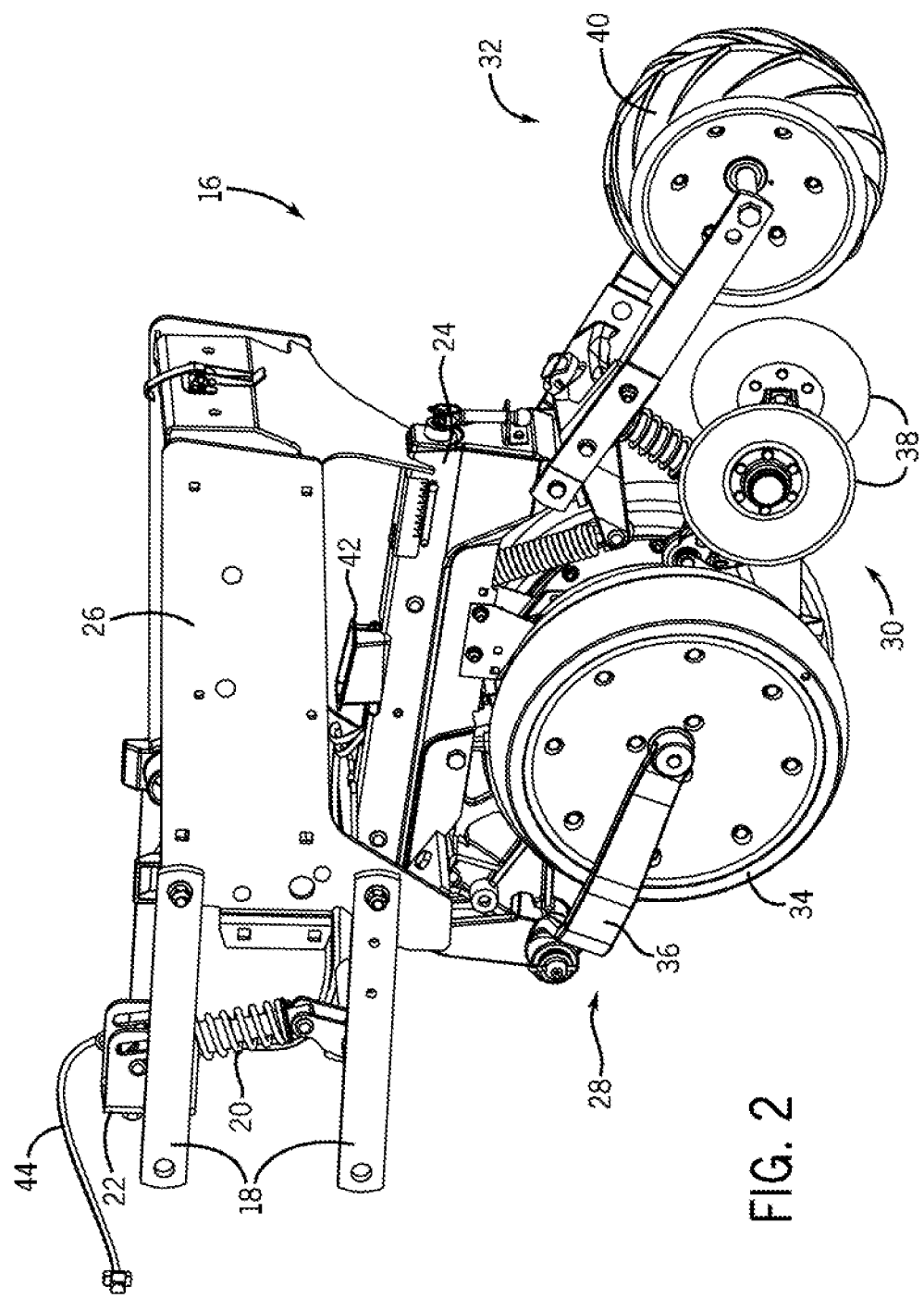
FIG. 2 is a perspective view of an embodiment of a row unit that may be employed within the agricultural implement of FIG. 1.

FIG. 2 is a perspective view of an embodiment of the row unit 16 that may be employed within the agricultural implement 10 of FIG. 1. As illustrated, the row unit 16 includes elements 18 of a parallel linkage assembly, also known as a four bar linkage, configured to couple the row unit 16 to the tool bar 14, while enabling vertical movement of the row unit 16. In addition, a biasing member 20 extends between a mounting bracket 22 and a lower portion of the parallel linkage to establish a contact force between the row unit 16 and the soil. In certain configurations, the biasing member 20 is adjustable to vary the contact force based on field conditions. For example, the biasing member 20 may be adjusted to compensate for hard or soft soil conditions. The parallel linkage elements 18 are pivotally coupled to a chassis 24 and a frame 26. The frame 26 may be configured to support various elements of the row unit 16 such as a metering system, for example.

As illustrated, the chassis 24 supports a coulter assembly 28, a soil closing assembly 30, and a packer assembly 32. In the present configuration, the coulter assembly 28 includes a gauge wheel 34 coupled to the chassis 24 by a rotatable arm 36. As discussed in detail below, the gauge wheel 34 may be positioned a vertical distance above a coulter disk to establish a desired trench depth for seed deposition into the soil. As the row unit 16 travels across a field, the coulter disk excavates a trench into the soil, and seeds are deposited into the trench. Next, closing disks 38 of the closing assembly 30 push the excavated soil into the trench, and a packer wheel 40 of the packer assembly 30 packs the soil on top of the deposited seeds. This process establishes a row of planted seeds within a field. By employing multiple row units 16 distributed along the tool bar 14, as shown in FIG. 1, multiple rows of seeds may be planted within the field.

As discussed in detail below, the chassis 24 also supports a seed tube 42 configured to provide seeds from a metering system to the soil. The exit to the seed tube 42 is positioned aft of the coulter disk and forward of the closing disks 38 such that the seeds are deposited into the trench before the trench is closed. In certain configurations, the seed tube 42 includes an electrostatic sensor configured to detect seeds passing through the tube 42 and/or to detect a blockage within the tube 42 (e.g., the electrostatic sensor may detect a blockage indirectly by detecting a cessation of seeds passing through the tube 42). The row unit 16 may also include sensor monitoring and/or processing circuitry configured to send signals from the electrostatic sensor to control circuitry of the implement 10 (e.g., an electronic control unit (ECU)) or tow vehicle via a bus. As illustrated, a wire 44 electrically couples the electrostatic sensor to the sensor monitoring circuitry. In certain embodiments, the electrostatic sensor may be integrated with the sensor monitoring circuitry. In such embodiments, the wire 44 electrically couples the sensor monitoring circuitry to control circuitry. As will be appreciated, in certain embodiments, the electrostatic sensor may communicate wirelessly with the sensor monitoring circuitry and/or other control circuitry. Because the electrostatic sensors may be manufactured at a low cost, the present embodiment may be more cost effective to implement, as compared to embodiments which utilize other types of sensors. Further, the electrostatic sensors may accurately detect a wider range of seed sizes than other types of sensors.

Figure 3:
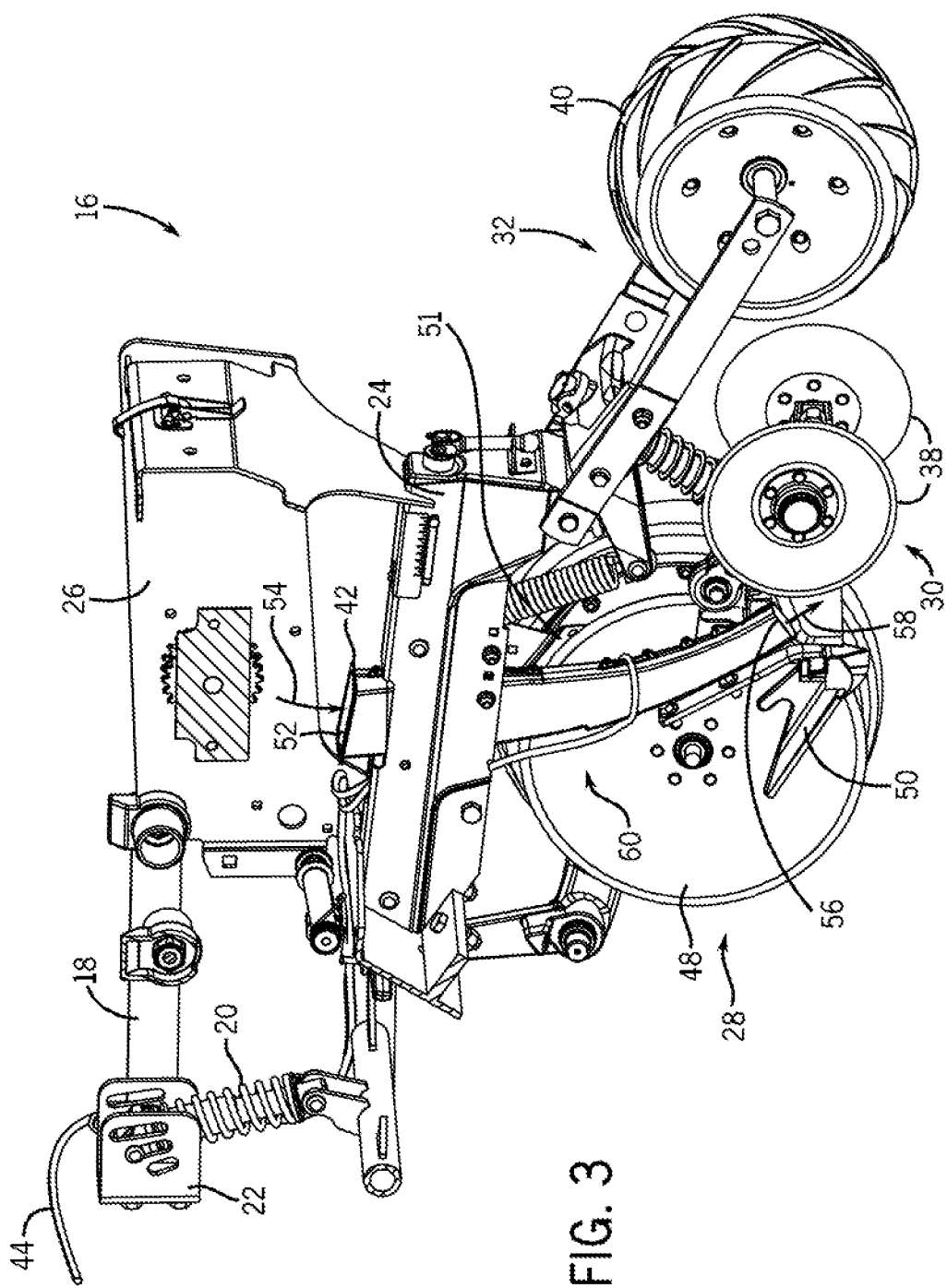
FIG. 3 is a perspective view of the row unit of FIG. 2, with certain structural elements removed to expose a seed tube having an electrostatic sensor.

FIG. 3 is a perspective view of the row unit 16 of FIG. 2, with certain structural elements removed to expose the seed tube 42. As illustrated, the coulter assembly 28 includes a coulter disk 48, a firming point 50 and a scraper 51, in addition to the gauge wheel 34 and rotatable arm 36 shown in FIG. 2. As previously discussed, the coulter disk 48 is configured to excavate a trench into the soil such that seeds may be deposited within the trench. The firming point 50 firms the loose soil in the bottom of the trench made by the coulter disk 48 to provide a consistent v-shape for the seed to sit. The scraper 51 is disposed against the disk 48 and configured to remove accumulated soil from the disk 48 as the disk rotates. The seed tube 42 is positioned aft of the coulter disk 48 and configured to transfer seeds from the metering system to the soil. Specifically, the seed tube 42 includes an inlet 52 configured to receive a flow of seeds from the metering system along a direction 54. The seeds then flow through the tube 42 and exit an outlet 56 of the tube in a direction 58. The outlet 56 is positioned such that the seeds are deposited within the freshly excavated trench. The closing disks 38, positioned aft of the seed tube 42, are configured to close the trench, and the packing wheel 40 is configured to pack the soil over the deposited seeds.

As illustrated, the seed tube 42 includes an electrostatic sensor 60 configured to detect seeds passing through the tube 42. In certain configurations, such as when planting canola, chickpea, corn, sorghum, soybean, and other crops, seeds are fed individually from the metering system to the soil via the seed tube 42. In such configurations, the electrostatic sensor 60 detects the presence of each seed as it passes the sensor and relays the seed detection information to sensor monitoring circuitry via output signals. The sensor monitoring circuitry amplifies the signals and relays them to control circuitry within the implement 10 or the tow vehicle. The control circuitry may be configured to monitor the rate at which seeds pass through the seed tube 42 of each row unit 16. If the rate is higher or lower than a desired range, the controller may alert the operator of the condition.

The operator may monitor the seed flow rate data (e.g., via a monitor within a cab of the work vehicle) to determine a proper speed to operate the work vehicle and/or settings for a product delivery system. For example, the operator may monitor the seed flow rate, as measured by the electrostatic sensors 60, to determine whether the seeds are being evenly distributed throughout the field. If the seed flow rate is not even, the operator may adjust the speed of the tow vehicle and/or the flow rate of the product, thereby maintaining a substantially consistent seed flow. As such, the present embodiment may increase the efficiency of seeding and planting operations.

Figure 4:
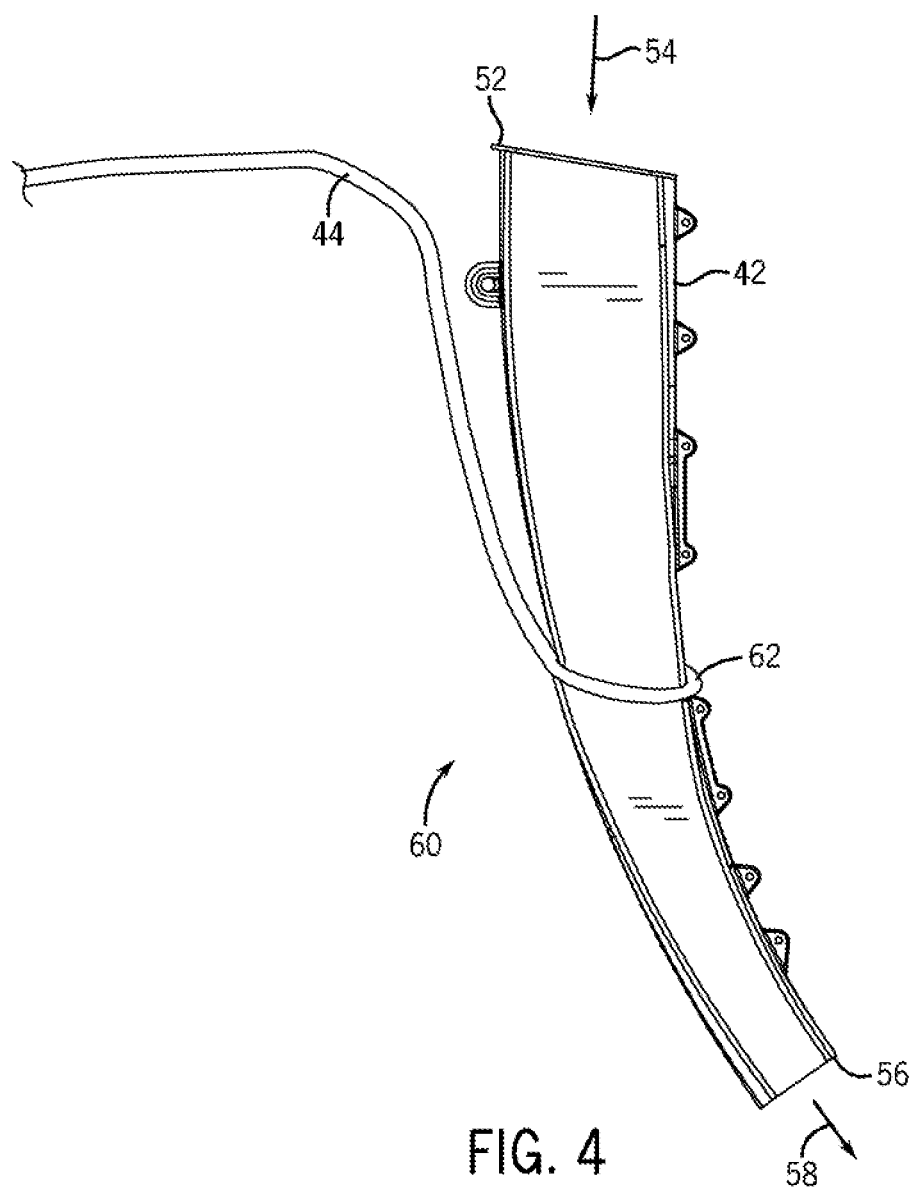
FIG. 4 is a side view of the seed tube of FIG. 3, illustrating an embodiment of the electrostatic sensor.

FIG. 4 is a side view of the seed tube 42 of FIG. 3, illustrating an embodiment of the electrostatic sensor 60. In the present embodiment, the electrostatic sensor 60 includes a conductive ring 62 (e.g., electrode) disposed about the exterior surface of the seed tube 42. It should be noted that the electrostatic sensor 60 may be formed into any suitable shape. For example, the electrostatic sensor 60 may be circular, square, oval, or triangular. Further, the conductive ring 62 may be formed from any suitable conductive material. For example, the conductive ring 62 may be formed from copper, aluminum, or another conductive material. The diameter of the conductor forming the ring may vary between embodiments of the electrostatic sensor 60. For example, in certain embodiments, the conductive ring 62 may be formed from wire of various standard or non-standard diameters (e.g., 6, 7, 10, 14, 15, 16, 20, 30, or 40 AWG). Furthermore, the dimension of the conductive ring 62 along the length of the seed tube may affect the sensitivity of the electrostatic sensor 60. For example, an increase in width may increase the signal gain of the electrostatic sensor 60, yet make it more difficult to identify individual seeds based on the signal output.

As illustrated, the wire 44 is electrically coupled to the conductive ring 62. During operation, seeds enter through the inlet 52 of the seed tube 42 and exit through the outlet 56 of the seed tube 42, thereby passing through the conductive ring 62. As will be appreciated, the seeds accumulate a static charge as the seeds are gravity fed through the product distribution system. As the statically charged seeds pass through the conductive ring 62 of the electrostatic sensor 60, the charged seeds induce a charge within the conductive ring 62. Thus, a signal is generated within the conductive ring 62, and transmitted through the wire 44. Further, the signal may be received by the sensor monitoring circuitry and/or control circuitry for amplification, monitoring and/or analysis (or other processing). As will be appreciated, the electrostatic sensor 60 may be used to detect blockage within the seed tube 42. For example, if the seed tube is blocked with product, the electrostatic sensor 60 may detect a cessation of seeds passing through the seed tube 42. By monitoring seeds flowing through the seed tube 42, the resulting data can be used to improve the efficiency of seeding operations.

Figures 5, 6:
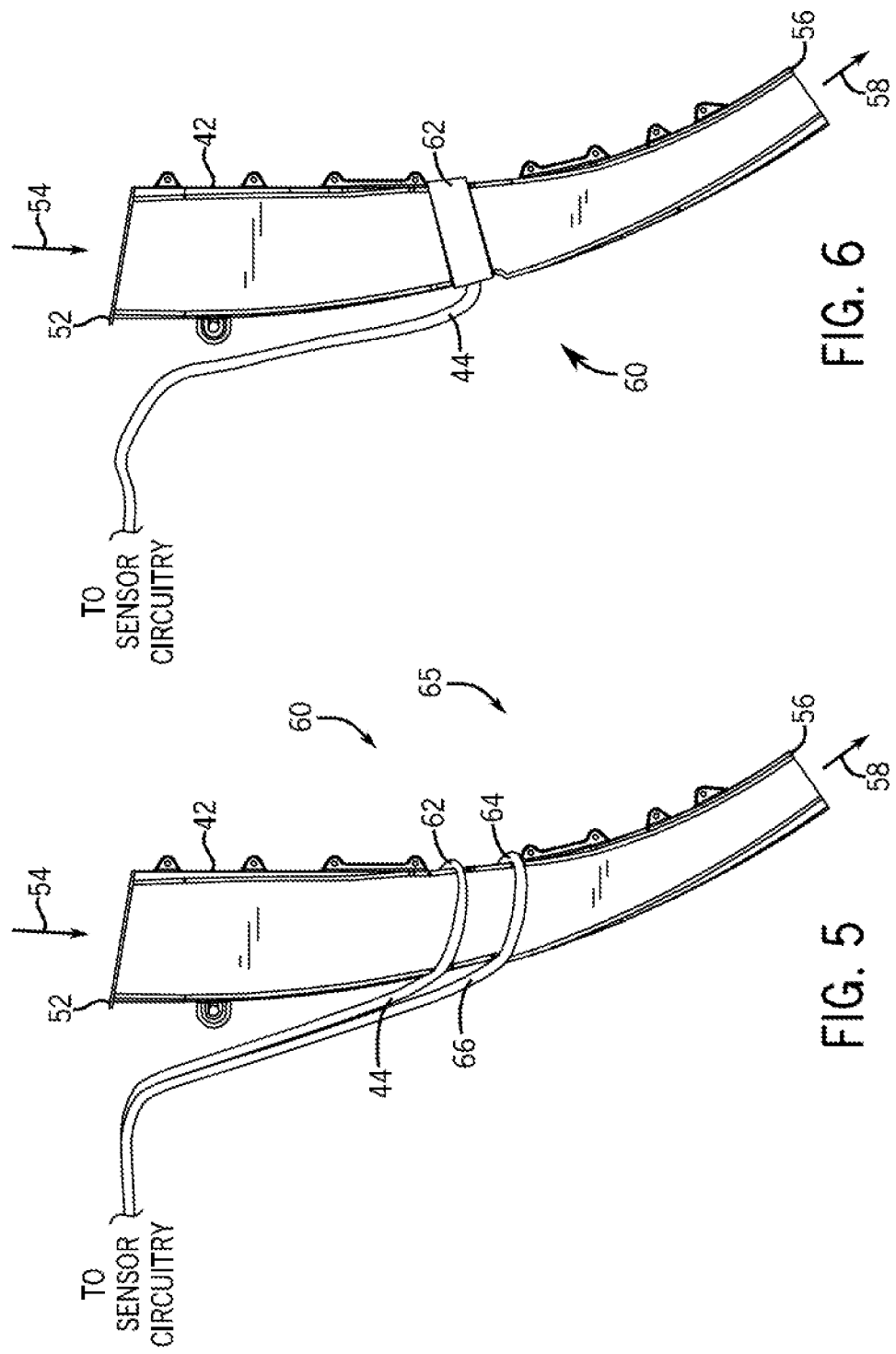
FIG. 5 is a side view of the seed tube of FIG. 3, employing multiple electrostatic sensors.
FIG. 6 is a side view of the seed tube of FIG. 3, illustrating another embodiment of the electrostatic sensor.

FIG. 5 is a side view of the seed tube 42 of FIG. 3, employing multiple electrostatic sensors. As illustrated, a second conductive ring 64 is disposed about the exterior surface of the seed tube 42, and forms a second electrostatic sensor 65 adjacent to the first electrostatic sensor 60. A second wire 66 is electrically coupled to the second electrostatic sensor 65 for transmitting signals to sensor monitoring circuitry and/or control circuitry. Employing two electrostatic sensors enables a speed to be determined for each seed passing through the seed tube 42. For example, a seed may be detected passing through the first conductive ring 62 at a first time. The seed may then be detected passing through the second conductive ring 64 at a second time. Thus, the speed in the axial direction at which the seed is passing through the seed tube 42 may be calculated by dividing the distance between the conductive rings 62 and 64 by the difference between the first and second times.

FIG. 6 is a side view of the seed tube 42 of FIG. 3, illustrating another embodiment of the electrostatic sensor 60. In this embodiment, the conductive ring 62 forms a conductive band around the seed tube 42. As discussed above, when the conductive material of the conductive ring 62 is distributed about a large width, the signal gain of the electrostatic sensor 60 may be increased. Thus, amplifying circuitry electrically coupled to the electrostatic sensor 60 may provide a smaller gain to achieve a desired signal strength. However, with a larger width, it may become more difficult to isolate signals from individual seeds. Thus, such an embodiment may be useful for systems that deliver seeds at a slow rate.

Figure 7:
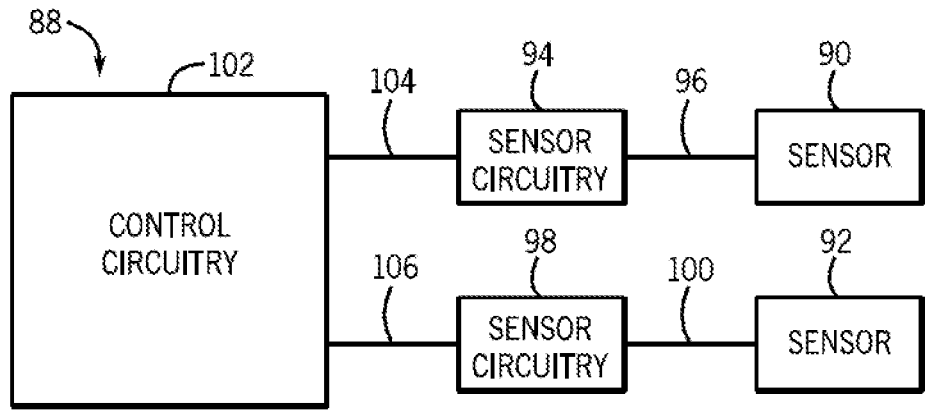
FIG. 7 is a block diagram of an embodiment of a product monitoring system including electrostatic sensors.

FIG. 7 is a block diagram of an embodiment of a product monitoring system 88 including electrostatic sensors. The product monitoring system 88 includes a first electrostatic sensor 90 and a second electrostatic sensor 92. It should be noted that although two electrostatic sensors 90 and 92 are employed in the illustrated embodiment, any number of electrostatic sensors may be utilized within the product monitoring system 88. For example, the product monitoring system 88 may include 1, 2, 4, 7, 9, 10, 20, or more electrostatic sensors. The first and second electrostatic sensors 90 and 92 may be used to monitor seed flow through respective seed tubes. Alternatively, the first and second electrostatic sensors 90 and 92 may be coupled to any conduit of the agricultural implement 10, or another type of agricultural implement, to measure respective product speed in the axial direction of the conduit. It should be appreciated that the first and second electrostatic sensors 90 and 92 may monitor the electrostatic charge of seeds, fertilizer, and/or any other agricultural product within the product delivery system.

The first electrostatic sensor 90 is electrically coupled to first sensor monitoring circuitry 94 via a wire 96. Further, the second electrostatic sensor 92 is electrically coupled to second sensor monitoring circuitry 98 via a wire 100. The wires 96 and 100 enable the first and second electrostatic sensors 90 and 92 to send signals and/or data to the first and second sensor monitoring circuitries 94 and 98, respectively. Likewise, the first and second sensor monitoring circuitries 94 and 98 send signals and/or data to control circuitry 102 using wires 104 and 106, respectively. During operation, the first and second electrostatic sensors 90 and 92 provide electrical current signals (e.g., current output) when a seed passes through the sensor. The first and second sensor monitoring circuitries 94 and 98 convert the electrical current signals to electrical voltage signals. Further, the first and second sensor monitoring circuitries 94 and 98 amplify the electrical voltage signals, and transmit the amplified electrical voltage signals to the control circuitry 102. As will be appreciated, the control circuitry 102 may use the signals and/or data for a variety of proposes. For example, the control circuitry 102 may determine a number of seeds that pass through the seed tube 42, determine a speed at which each seed passes through the seed tube 42, determine a rate of seeds being planted by the seed tube 42, and so forth. Further, the control circuitry 102 may provide feedback to an operator. The control circuitry 102 may also control the settings of the product delivery system (e.g., meter rollers, air conveyance systems, etc.) based on the seed flow rate. As such, by using the product monitoring system 88, seeds may be evenly planted in a field at a desired seed spacing, thereby reducing costs associated with planting. It should be noted that the control circuitry 102 may include software, hardware, or a combination of software and hardware.

Although the sensors 90 and 92, the sensor circuitries 94 and 98, and the control circuitry 102 are illustrated as being separate devices, in certain embodiments the sensor and sensor circuitry may be integrated into a single device that is coupled to the seed tube 42. In another embodiment, the sensor, sensor circuitry, and control circuitry 102 may be integrated into a single device that is coupled to the seed tube 42. In such a configuration, the control circuitry 102 may process the signals from the sensor, and output digital data (e.g., quantities and rates) to other control circuitry within the implement or work vehicle (e.g., to control other systems, and/or to provide feedback to an operator). As will be appreciated, the control circuitry 102 may be located on the implement 10, and/or on the tow vehicle.

Figure 8:
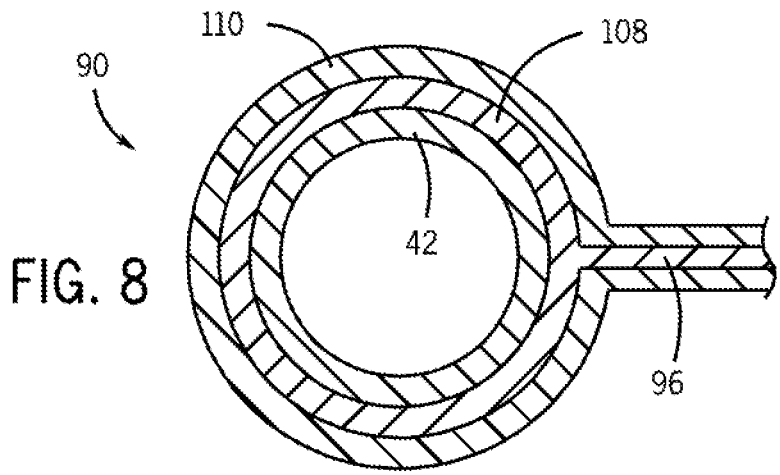
FIG. 8 is a cross-sectional view of an embodiment of an electrostatic sensor.

FIG. 8 is a cross-sectional view of an embodiment of the electrostatic sensor 90. In this embodiment, the electrostatic sensor 90 is disposed about the seed tube 42. However, as will be appreciated, the electrostatic sensor 90 may be disposed about any suitable tube, conduit, or passageway within a product delivery system. The electrostatic sensor 90 includes a conductive ring 108 that completely encircles the seed tube 42. As illustrated, the wire 96 is electrically coupled to the conductive ring 108. A shielding material 110 is disposed about the outer surface of the conductive ring 108. The shielding material 110 may be formed using any suitable material to reduce noise and/or block electromagnetic interference from being detected by the conductive ring 108. For example, the shielding material 110 may be formed from a conductive material such as aluminum. As illustrated, certain embodiments may also include shielding material disposed about the wire 96. The shielding material 110 includes an insulative layer to insulate the shielding material 110 from the conductive ring 108. Using the electrostatic sensor 90, seeds may be detected as they pass through the conductive ring 108. Control circuitry 102 may use the detected data to calibrate or adjust the output of a product distribution system to more evenly distribute seeds and/or other agricultural product throughout a field.

Figure 9:
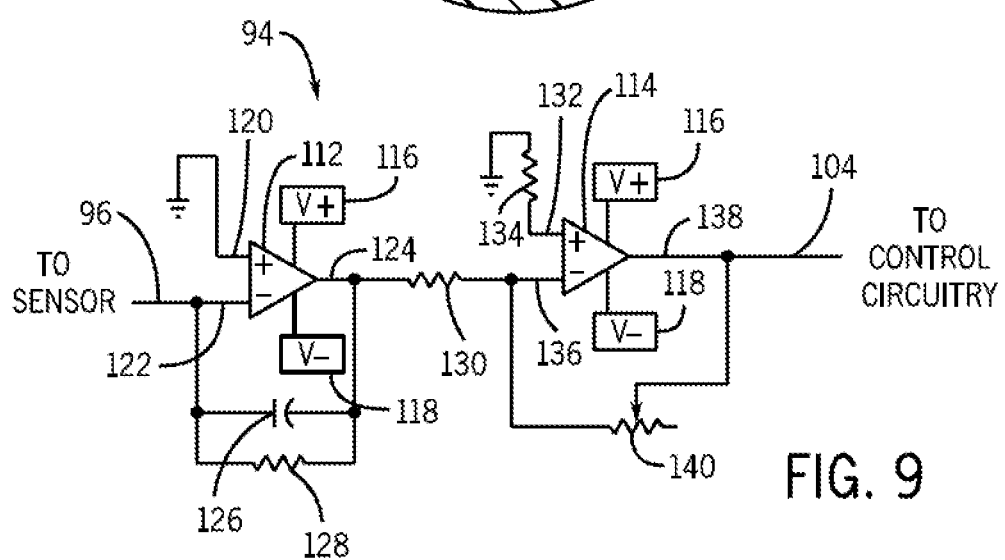
FIG. 9 is a schematic diagram of an embodiment of sensor circuitry for amplifying data from an electrostatic sensor.

FIG. 9 is a schematic diagram of an embodiment of sensor circuitry 94 for amplifying the signal from the electrostatic sensor 90. The sensor circuitry 94 includes a first operational amplifier 112 that functions as a charge amplifier, and a second operational amplifier 114 that functions as an amplifying device. Each of the operational amplifiers 112 and 114 are powered by a positive voltage 116 (e.g., 2.5 volts) and a negative voltage 118 (e.g., −2.5 volts). A non-inverting input 120 of the first operational amplifier 112 is electrically coupled to a reference potential (e.g., Earth ground), while an inverting input 122 of the first operational amplifier 112 is electrically coupled to the electrostatic sensor 90 via the wire 96. The first operational amplifier 112 also includes an output 124. As illustrated, feedback from the output 124 is transferred to the inverting input 122 via a capacitor 126 and a resistor 128, electrically coupled in parallel to one another. Thus, the first operational amplifier 112 is configured as a charge amplifier to convert current produced by the electrostatic sensor 90 (e.g., in response to interaction with an electrically charge seed) into a voltage signal. As will be appreciated, the voltage signal may be a small voltage (e.g., in the millivolt range).

The voltage signal is transmitted through a resistor 130 to the second operational amplifier 114. As illustrated, a non-inverting input 132 of the second operational amplifier 114 is electrically coupled to a reference potential (e.g., Earth ground) via a resistor 134. An inverting input 136 of the second operational amplifier 114 is electrically coupled to the resistor 130 to receive the voltage signal from the first operational amplifier 112. Further, the second operational amplifier 114 produces an output 138 that is transmitted to the control circuitry 102 via the wire 104. The output 138 is transferred to the inverting input 136 via a potentiometer 140. As will be appreciated, the resistance between the output 138 and the inverting input 136 may be adjusted by adjusting the potentiometer 140, thereby adjusting the gain of the second or amplifying operational amplifier 114. Thus, the second operational amplifier 114 amplifies the voltage signal to a sufficient voltage (e.g., approximately 5 volts) for use by the control circuitry 102. It should be noted that FIG. 9 illustrates only one embodiment of the sensor circuitry 94. Accordingly, various modifications and/or changes will occur to those skilled in the art.

Figure 10:
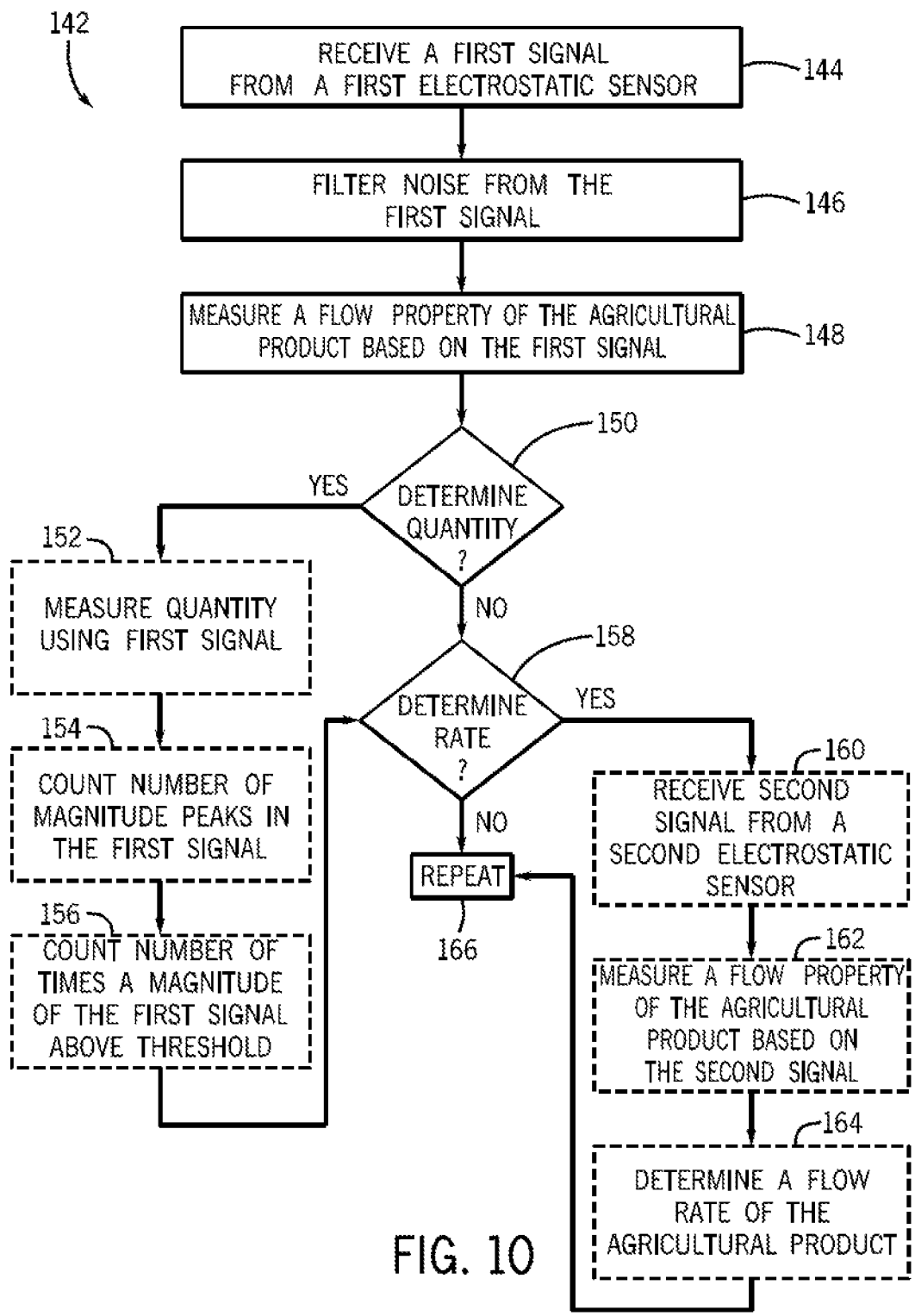
FIG. 10 is a flowchart of a method for monitoring agricultural product passing through a conduit of an agricultural product delivery system.

FIG. 10 is a flowchart of a method 142 for monitoring agricultural product passing through a conduit of an agricultural product delivery system. At block 144, the control circuitry 102 receives a first signal from the first electrostatic sensor 90. The first signal is indicative of the agricultural product passing through the conduit of the agricultural product delivery system. Then, at block 146, the control circuitry 102 filters the first signal to reduce noise. For example, the control circuitry 102 may use a low pass filter (e.g., Butterworth, Chebyshev, Bessel, etc.), or any other suitable filter to reduce the noise. Next, at block 148, the control circuitry 102 measures one or more flow properties of the agricultural product based on the first signal (e.g., quantity, rate, etc.). For example, at block 150, the control circuitry 102 may decide whether to determine a quantity of the agricultural product that passes by the first electrostatic sensor 90.

If the control circuitry 102 decides to determine the quantity of the agricultural product that passes by the first electrostatic sensor 90, the control circuitry 102 may measure the quantity of the agricultural product passing through the conduit of the agricultural product delivery system, per block 152 (e.g., the control circuitry 102 may locate individual waveforms of agricultural product passing through the conduit). For example, in certain embodiments, the control circuitry 102 may measure the at least one flow property by counting a number of magnitude peaks in the first signal, as illustrated in block 154. As another example, in other embodiments, the control circuitry 102 may measure the one or more flow properties by counting a number of times a magnitude of the first signal increases above a predetermined threshold value, as illustrated in block 156.

If the control circuitry 102 decides not to determine the quantity of the agricultural product that passes the first electrostatic sensor 90, the control circuitry 102 may decide whether to determine a rate or speed of the agricultural product that passes through the conduit, per block 158. Further, the control circuitry 102 may decide whether to determine a rate or speed of the agricultural product that passes through the conduit if the control circuitry 102 has determined the quantity of the agricultural product that passes the first electrostatic sensor 90. As such, if the control circuitry 102 decides to determine the rate or speed that agricultural product passes through the conduit, the control circuitry receives a second signal from the second electrostatic sensor 92, per block 160. The second signal is indicative of the agricultural product passing through the conduit of the agricultural product delivery system. Then, at block 162, the control circuitry 102 may measure a flow property of the agricultural product based on the second signal. Next, at block 164, the control circuitry may determine a speed (e.g., in the axial direction of the conduit) of the agricultural product based on the first signal and the second signal. At block 166, the control circuitry 102 may repeat 166 the method 142. It should be noted that any of the blocks listed above may be combined together into a single block, separated into multiple blocks, performed in a different order, and so forth. As will be appreciated, the control circuitry 102 may be used to aid the implement 10 in uniformly planting seeds in a field, thereby increasing product yield and planting efficiency.

While only certain features of the invention have been illustrated and described herein, many modifications and changes will occur to those skilled in the art. It is, therefore, to be understood that the appended claims are intended to cover all such modifications and changes as fall within the true spirit of the invention. For example, the embodiments described herein have focuses on detecting and analyzing signals that relate to agricultural product. However, as will be appreciated, the disclosed embodiments may also be used with any type of material that moves through a conduit.

The invention claimed is:
1. An agricultural product delivery system comprising:
   a conduit configured to enable a particulate agricultural product to pass therethrough; and
   a first electrostatic sensor coupled to a first axial location of the conduit, and configured to detect particles of the particulate agricultural product passing through the conduit and to output a signal indicative of a quantity of the particles of the particulate agricultural product passing through the conduit, wherein the first electrostatic sensor comprises an electrically conductive ring that extends continuously about a periphery of the conduit.

2. The agricultural product delivery system of claim 1, wherein the first electrostatic sensor is disposed about an exterior surface of the conduit.

3. The agricultural product delivery system of claim 1, comprising a shielding material disposed about the first electrostatic sensor to reduce electromagnetic interference with the first electrostatic sensor.

4. The agricultural product delivery system of claim 1, comprising sensor monitoring circuitry electrically coupled to the first electrostatic sensor, the sensor monitoring circuitry configured to amplify the signal output by the first electrostatic sensor.

5. The agricultural product delivery system of claim 4, comprising control circuitry electrically coupled to the sensor monitoring circuitry, and configured to receive the amplified signal from the sensor monitoring circuitry and to determine the quantity of the particles based on the amplified signal.

6. The agricultural product delivery system of claim 1, comprising a second electrostatic sensor coupled to a second axial location of the conduit, and configured to detect the particles of the particulate agricultural product passing through the conduit.

7. The agricultural product delivery system of claim 6, comprising control circuitry electrically coupled to the first electrostatic sensor and to the second electrostatic sensor, the control circuitry configured to determine a speed of the particles of the particulate agricultural product passing through the conduit via signals output from the first electrostatic sensor and the second electrostatic sensor.

8. A method for monitoring agricultural product passing through a conduit of an agricultural product delivery system comprising:
receiving a first signal from a first electrostatic sensor indicative of the agricultural product passing through the conduit of the agricultural product delivery system;
measuring at least one flow property of the agricultural product based on the first signal, wherein measuring the at least one flow property comprises counting a number of times a magnitude of the first signal increases above a threshold value; and
receiving a second signal from a second electrostatic sensor positioned at an axial location different from the first electrostatic sensor, wherein the second signal is indicative of the agricultural product passing through the conduit of the agricultural product delivery system, and measuring the at least one flow property comprises determining a speed of the agricultural product based on the first signal and the second signal.

9. The method of claim 8, wherein measuring the at least one flow property comprises filtering the first signal to reduce noise.

10. The method of claim 8, wherein the at least one flow property comprises a quantity of the agricultural product passing through the conduit of the agricultural product delivery system.

11. An agricultural product delivery system comprising:
a first electrostatic sensor configured to couple to a conduit to detect particles of a particulate agricultural product passing through the conduit;
sensor monitoring circuitry electrically coupled to the first electrostatic sensor, the sensor monitoring circuitry configured to amplify first signals output by the first electrostatic sensor; and
control circuitry electrically coupled to the sensor monitoring circuitry, and configured to receive the amplified first signals from the sensor monitoring circuitry, and to determine a quantity of the particles of the particulate agricultural product passing through the conduit, wherein the electrostatic sensor comprises an electrically conductive ring that extends continuously about a periphery of the conduit.

12. The agricultural product delivery system of claim 11, wherein the control circuitry is configured to adjust a delivery rate of the agricultural product based on the determined quantity of the particles of the particulate agricultural product passing through the conduit.

13. The agricultural product delivery system of claim 11, wherein the first signals output by the first electrostatic sensor comprise an electrical current signal, the sensor monitoring circuitry comprises a charge amplifier to convert the electrical current signal to an electrical voltage signal, and the sensor monitoring circuitry comprises an amplifying device to amplify the electrical voltage signal.

14. The agricultural product delivery system of claim 13, wherein the amplifying device comprises an adjustable gain.

15. The agricultural product delivery system of claim 1, comprising control circuitry configured to identify a blockage within the conduit based on cessation of the particles passing through the conduit.

16. The agricultural product delivery system of claim 1, comprising control circuitry configured to determine the quantity of the particles of the particulate agricultural product passing through the conduit based on the signal, and wherein determining the quantity of the particles comprises counting a number of times a magnitude of the signal exceeds a threshold value.

17. The agricultural product delivery system of claim 11, wherein the control circuitry is configured to determine the quantity of the particles by counting a number of times a magnitude of the amplified signals exceeds a threshold value.

18. The agricultural product delivery system of claim 1, comprising control circuitry configured to determine the quantity of the particles of the particulate agricultural product passing through the conduit based on the signal, wherein determining the quantity of the particles comprises locating individual waveforms corresponding to the particles passing through the conduit of the agricultural product delivery system.

19. The agricultural product delivery system of claim 17, wherein the electrostatic sensor comprises an electrically conductive ring that extends continuously about a periphery of the conduit.

20. The agricultural product delivery system of claim 11, comprising a second electrostatic sensor axially spaced apart from the first electrostatic sensor and configured to output second signals indicative of the agricultural product passing through the conduit of the agricultural product delivery system, wherein the control circuitry is configured to determine a speed of the agricultural product based on the first signals and the second signals.

21. The agricultural product delivery system of claim 11, wherein the control circuitry is configured to determine the quantity of the particles by locating individual waveforms corresponding to the particles passing through the conduit of the agricultural product delivery system.

\* \* \* \* \*